Nov. 3, 1942.   E. W. BERRY   2,300,723
FAN
Filed March 31, 1941   2 Sheets-Sheet 1
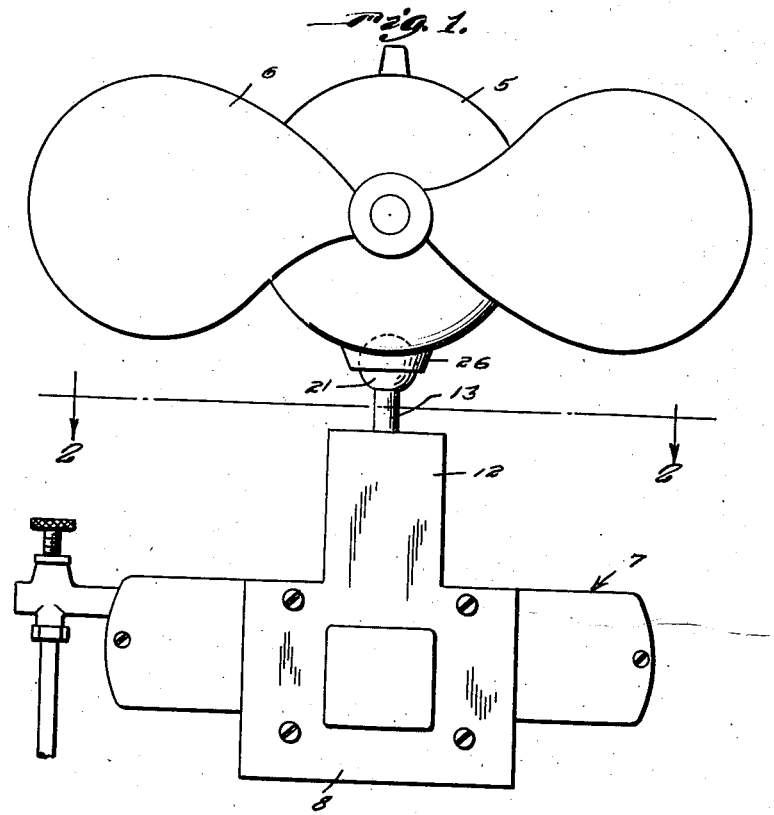
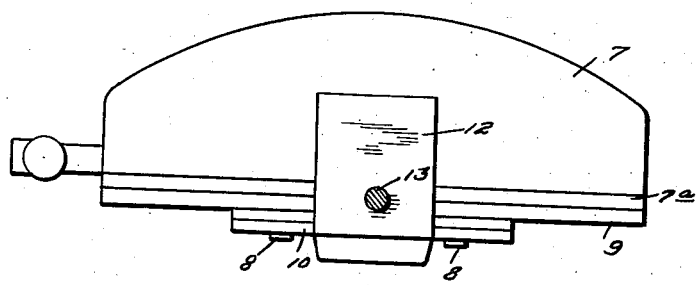
Inventor
ELMER WILLIAM BERRY
By Clarence A. O'Brien
Attorney Nov. 3, 1942.   E. W. BERRY   2,300,723
FAN
Filed March 31, 1941   2 Sheets-Sheet 2
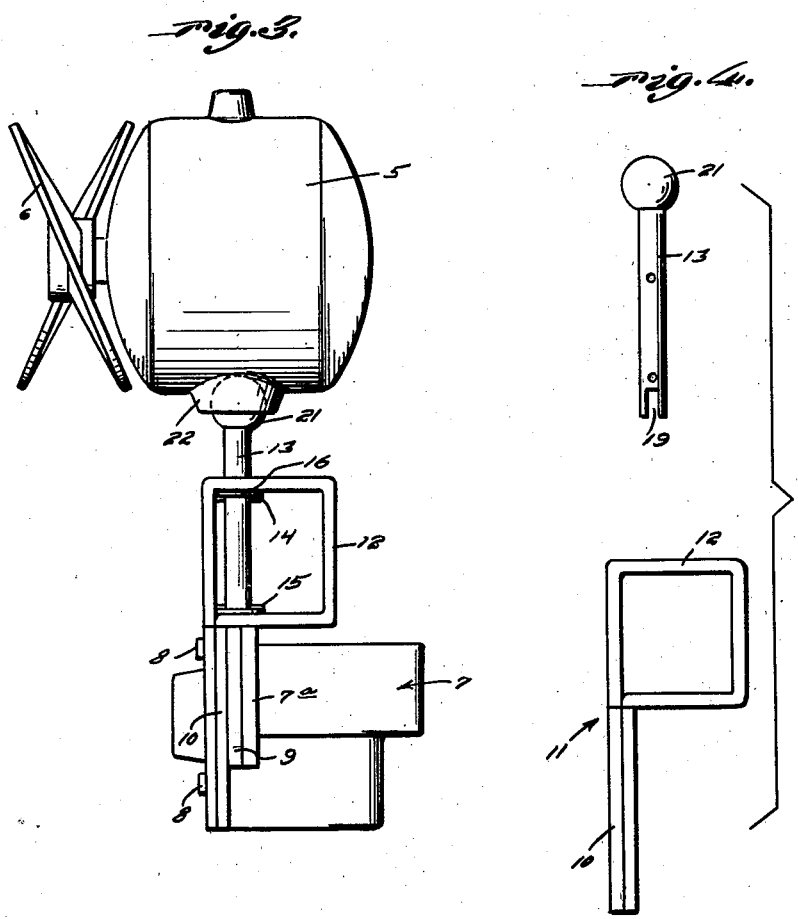
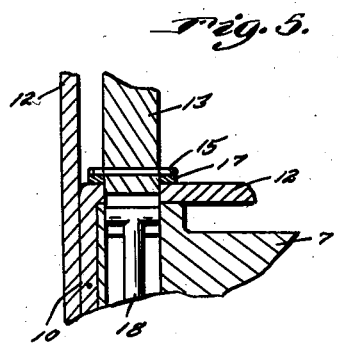
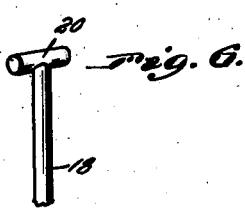
Inventor
ELMER WILLIAM BERRY
By *Clarence A. O'Brien*
Attorney Patented Nov. 3, 1942

2,300,723

UNITED STATES PATENT OFFICE 2,300,723

FAN

Elmer William Berry, Niagara Falls, N. Y.

Application March 31, 1941, Serial No. 386,155

2 Claims. (Cl. 230—256)

This invention relates to fans and more particularly to fans such as used in an automobile for directing air currents against a windshield for the purpose of keeping it free from fog, frost, etc.

The primary object of the present invention is to provide an oscillating fan of the type described.

A further object of the invention is to provide an oscillating fan for use as above stated and which will have advantages over fans now generally used for the stated purpose in that it will direct air currents over substantially the entire surface of the windshield so as to give clear vision for the entire area of the windshield instead of merely through a small or localized area of the windshield as is now generally the case.

The invention together with its objects and advantages will be best understood from a study of the following description taken in connection with the accompanying drawings wherein—

Figure 1 is an elevational view of the improved fan embodying the features of the present invention.

Figure 2 is a horizontal sectional view taken substantially on the line 2—2 of Figure 1.

Figure 3 is an elevational view of the fan taken at right angles to Figure 1.

Figure 4 is an exploded view of a bracket and a driven supporting post forming part of the invention.

Figure 5 is a fragmentary detail sectional view showing the manner of coupling the lower end of the supporting post with the driving end of the vacuum motor shaft.

Figure 6 is a fragmentary perspective view showing the driving end of the shaft of the vacuum motor.

Referring more in detail to the drawings it will be seen that in accordance with the present invention a conventional motor-driven fan is employed, the same, as illustrated, comprising a suitable motor 5, preferably an electric motor, and equipped with the usual motor shaft from which the fan elements or blades 6 are operated.

Further in accordance with my invention, use is made of a conventional fluid pressure motor 7 of the suction or vacuum-operated type and is now generally employed as a driving medium for a windshield wiper blade, or in other words is now generally employed as a part of a motor-driven windshield wiper assembly.

Bolted, or otherwise secured, as at 8, to the cap 9 of the vacuum motor 7 is the body portion 10 of a bracket indicated generally by the reference numeral 11. The body portion 10 is preferably formed of two plies of plate material such as iron or the like as shown, and integral with the body 10 of the bracket, and disposed above the motor 7, is a frame-like structure 12 through the top and bottom members of which is journaled a supporting post 13.

The post 13 has transverse openings therethrough to accommodate, within the confines of the frame part 12 of the bracket, cotter pins or the like 14, 15.

Disposed on the post 13, between the upper cotter pin 14 and the upper member of the frame 12, is a thrust washer 16 while a similar washer or collar 17 is disposed on the post 13 between the lower cotter pin 15 and the lower member of the frame 12.

At the lower end thereof the post 13 extends into the bearing formed by the head 7a and cap 9 of the motor 7 for the driving shaft 18 of the motor 7.

At the lower end thereof, the post 13 is provided with a transverse slot 19 which accommodates a cross-head 20 provided on the free end of the motor shaft 18 whereby a quick detachable connection is effected between the post 13 and the shaft 18 for placing the post 13 in driven engagement with the shaft 18.

On the upper or free end thereof, the post 13 is provided with a spherical head 21 that seats in a socket 22 provided therefor on the underside of the casing of the motor 5 whereby a universal joint connection is effected between the casing of the motor 5 and the post 13 permitting the motor 5 to be positioned at any desired angle relative to the axis of the post 13, and as may be found desirable to obtain maximum results from the use of the device.

As shown, the motor 7 is suitably provided for connecting it with a source of suction or vacuum, and in actual practice the motor 7, together with the associated parts or, in other words, the complete assembly as shown in Figure 3, is to be conveniently mounted in the automobile in proper proximity to the windshield thereof so that the air currents will be directed by the fan elements 6 against the surface of the windshield as the motor 5, in response to the driving action of the motor 7 on the post 13, oscillates.

It will be apparent that in using this fan assembly in conjunction with a car heater, the warm currents of air will be directed over substantially the entire surface of the windshield keeping such surface free of fog, frost, accumulations of snow, sleet, etc., to the end that for the full area of the windshield visibility is provided thereby. Such a fan assembly will, accordingly, be found especially useful on motor buses, trucks, and analogous vehicles, as well as on pleasure vehicles.

Further, with the use of an oscillating fan assembly embodying the features of the present invention, there will be no creation of drafts to the discomfort of the occupants of the vehicle.

It is to be understood that I do not wish to limit myself to the precise details of construction, combination and arrangement of elements as herein illustrated and described, since various modifications will suggest themselves by the use of the device on the part of those skilled in the art.

Having thus described the invention what is claimed as new is:

1. In a fan assembly, a vacuum motor, a bracket secured to the casing of said motor and extending upwardly therefrom, a supporting post perpendicularly journaled in said bracket, interengaging means on one end of said supporting post and on the driving shaft of said motor detachably connecting said post and shaft together, a second motor mounted on said post, and a fan element mounted on and driven by said second motor.

2. In a fan assembly of the character described, a supporting bracket, a post rotatably mounted in said supporting bracket, a power-driven fan mounted on one end of the post for angular disposition relative to the axis of the post, and driving means connected with said post for oscillating the latter; said driving means including an oscillating motor having a shaft provided with a cross-head at one end thereof, and said post having a notch in one end thereof and with which said cross-head is engaged for effecting a driving connection between said shaft and post.

ELMER WILLIAM BERRY.